United States Patent [19]
Winter

[11] Patent Number: 5,024,717
[45] Date of Patent: Jun. 18, 1991

[54] LABELLING APPARATUS

[75] Inventor: Horst Winter, Neutraubling, Fed. Rep. of Germany

[73] Assignee: Krones AG Hermann Kronseder Maschinenfabrik, Bohmerwaldstr, Fed. Rep. of Germany

[21] Appl. No.: 449,884
[22] PCT Filed: Jun. 30, 1988
[86] PCT No.: PCT/EP88/00573
§ 371 Date: Nov. 30, 1989
§ 102(e) Date: Nov. 30, 1989
[87] PCT Pub. No.: WO89/00133
PCT Pub. Date: Jan. 12, 1989

[30] Foreign Application Priority Data

Jul. 4, 1987 [DE] Fed. Rep. of Germany ....... 3722220
Jun. 22, 1988 [DE] Fed. Rep. of Germany ....... 8808030

[51] Int. Cl.[5] ......................... B26D 5/00; B32B 31/00
[52] U.S. Cl. .................................... 156/354; 156/521; 156/DIG. 33
[58] Field of Search ............... 156/350, 353, 354, 355, 156/521, 523, 556, 566, 567, 568, DIG. 33

[56] References Cited

U.S. PATENT DOCUMENTS

| | | | |
|---|---|---|---|
| 3,565,724 | 2/1971 | Yamaguchi | 156/354 |
| 3,867,233 | 2/1978 | Eder et al. | 156/571 |
| 4,108,710 | 8/1978 | Hoffmann | 156/521 X |
| 4,526,654 | 7/1985 | Malthouse et al. | 156/521 X |
| 4,629,528 | 12/1986 | Tanaka et al. | 156/354 X |
| 4,763,823 | 8/1988 | Eder et al. | 156/521 X |

FOREIGN PATENT DOCUMENTS

| | | |
|---|---|---|
| 1511905 | 11/1969 | Fed. Rep. of Germany . |
| 2632332 | 1/1978 | Fed. Rep. of Germany . |
| 2151733 | 4/1973 | France . |
| 2119346 | 11/1983 | United Kingdom . |

*Primary Examiner*—William A. Powell
*Attorney, Agent, or Firm*—Nilles & Nilles

[57] ABSTRACT

The invention describes a labelling apparatus for containers to which the labels are supplied as a strip material. The apparatus comprises a controllable label strip feeding mechanism, followed by a cutting mechanism for separating individual labels from the label strip and a pallet rotor having adhesion surfaces for picking up the separated individual labels.

In order to enable the labelling operation to be readily interrupted and subsequently resumed, particularly in the case of gaps in the container supply, the invention provides that the cutting mechanism is composed of a stationary knife and a vacuum cylinder equipped with revolving blades, and that in the operative position the pallet rotor is disposed tangentially closely adjacent the circumferential surface of the vacuum cylinder, the circumferential surfaces of the vacuum cylinder and of the pallet rotor being adapted to have their radial spacing varied and to be shifted fromn the operative position to an inoperative position in which the circumferential surfaces of the vacuum cylinder and the pallet rotor are radially spaced from one another.

17 Claims, 4 Drawing Sheets

LABELLING APPARATUS

DESCRIPTION

Figure 1:
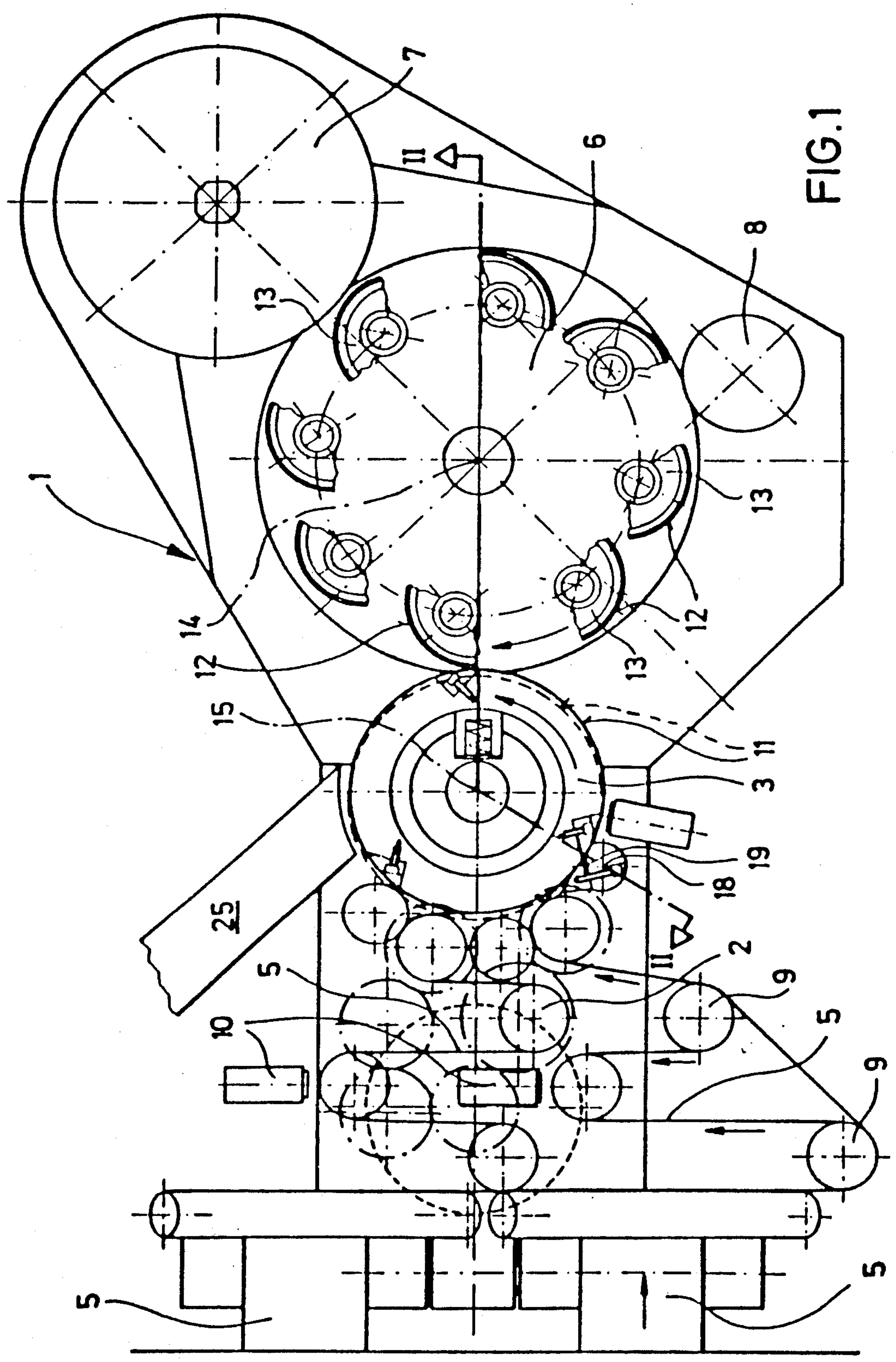

The invention relates to a labelling apparatus for affixing labels to containers.

Labelling machines to which the label material is supplied in the form of a strip are of economical interest, because the cost of an individual label is conspicuously lower than in the case of pre-cut separate labels.

A labelling apparatus of the type defined above in known from DE-OS 22 36 835. In the labelling apparatus shown and described in this publication, the label strip is guided over guide pulleys towards a blade cylinder operable to cut individual labels therefrom. The thus separated individual label is subsequently guided over further guide pulleys towards an attaching cylinder operable to attach each label to the peripheral surface of a respective pallet of the pallet rotor. In the further course of operations a transfer cylinder takes the meanwhile adhesive-coated individual label off the pallet rotor and attaches it to a container. The blade cylinder is rotated at the same speed as the strip feeding mechanism, so that a given blade cylinder is only capable of cutting labels of uniform size. Another disadvantage of the known labelling apparatus resides in the fact that in the case of an interruption of the supply of bottles or containers to the labelling apparatus, individual labels continue to be attached to the pallet rotor, potentially resulting in fouling and malfunction of the apparatus.

Known from DE-PS 32 16 138 is a labelling apparatus using stacked labels. This labelling apparatus comprises a pallet rotor the adhesive pallets of which are guided in a groove so as to be pivotable about individual shafts mounted at excentric positions relative to the rotor shaft. The pallet rotor is provided with clutch means permitting the individual adhesive pallets to be released from their engagement with the groove, so that the adhesive pallets can be pivotally displaced away from the label magazine. In the case of a gap between the bottels or containers to be labelled, the associated adhesive pallet can thus be uncoupled and thereby prevented from picking up a label.

It is an object of the invention to provide a labelling apparatus of the type defined in the introduction, which permits the labelling operation to be readily interrupted and subsequently restarted, particularly in the case of gaps in the container supply or malfunction of the label strip feeding mechanism.

In the operative state of the apparatus according to the invention, the labels are removed from the circumferential surface of the vacuum cylinder by rolling contact with the previously adhesive-coated pallets of the pallet rotor, and subsequently peeled off the pallets by a transfer cylinder provided with mechanically controlled gripper fingers for transfer to containers advanced past the apparatus as by means of a rotary table. To shift the apparatus from its operative state to an inoperative state, in which no transfer of labels is to take place, the invention proposes the distance between the vacuum cylinder supplying the individual labels and the adhesive-coated pallets to be variable, so that in the inoperative state the pallets are prevented from contacting the vacuum cylinder, as a result of which the separated individual label is retained on the vacuum cylinder and cannot be removed therefrom by a pallet of the pallet rotor. The variation of the named distance is effective in a surprisingly simple manner to ensure that the separated individual label remains on the vacuum cylinder and is not removed therefrom in the described manner by a respective pallet of the pallet rotor. Another advantage resides in the fact that even in the case of extended gaps between containers the vacuum cylinder is not soiled by the adhesive supplied to the pallets of the pallet rotor, which might otherwise impair the proper function of the vacuum cylinder.

Due to the fact that the shift between the operative state and the inoperative state is brought about by varying the spacing between the circumferential surfaces of the vacuum cylinder and the pallet rotor, it is now no longer required to actuate individual adhesive pallets in response to the occurrence of a gap between containers.

The named spacing can be varied in several different manners.

In accordance with a first embodiment the invention provides the axis of rotation of the vacuum cylinder is mounted at a radially variable spacing from the pallet torot, in which case a synchronizing transmission operatively connecting the pallet rotor to the vacuum cylinder includes a coupling mechanism for compensating variations of the inter-axial spacing. Coupling mechanisms of this type are commercially available and known for instance as "Schmidt-Kupplung". The shifting operation by varying the spacing between the axes of rotation of the pallet rotor and the vacuum cylinder, respectively, results in the advantage that only a single shifting movement is required, irrespective of the number of adhesive pallets carried by the pallet rotor and of the actual position of the pallet rotor.

In this case it is particularly advantageous that the vacuum cylinder is mounted for radial displacement away from the pallet rotor. The mass of the vacuum cylinder is usually smaller than that of the pallet rotor, so that the shifting of the vacuum cylinder permits a quicker response to the occurrence of gaps between bottles.

According to another implementation of this first embodiment, the vacuum cylinder is mounted for pivotal displacement about a pivot axis extending parallel to its axis of rotation. This permits the vacuum cylinder to be simply pivoted away from the pallet rotor without interrupting the drive-transmitting connection between the pallet rotor and the vacuum cylinder, since the transmission may include a coupling mechanism permitting compension of the radial displacement. The pivot axis of the vacuum cylinder may advantageously be approximately coincident with the longitudinal axis of the stationary knife. This is because in this case the blade cylinder is still able to cut labels after it has been pivoted away from the pallet rotor. This permits a single-step indexing operation also in the case of a very high bottle through-put per time unit, because the labelling apparatus as a whole remains in operation, and only the label transfer from the vacuum cylinder to the pallet rotor is interrupted. Since the drive mechanism of the vacuum cylinder does not operate in synchronism with the label feeding mechanism as in prior art, but rather at a slightly higher speed so as to exert a straightening pull on the labels, it is also possible, in the case of wider gaps between bottles, to stop the label feeding mechanism and to continue the operation of the vacuum cylinder and the pallet rotor in the inoperative position.

In this first embodiment, a greater versatility of the arrangement of the pivot axis of the vacuum cylinder is advantageously obtained by the provision that the vacuum cylinder, formed as a blade cylinder, and the stationary knife are supported on a common pivot lever. In this manner the correct cooperation of the stationary knife with the blade cylinder is ensured at all times, irrespective of whether the vacuum cylinder is in its operative or in its inoperative position. Since the ribbon feeding speed can be controlled independently of the rotary speed of the vacuum cylinder, the difference between these speeds may be adjusted for cutting labels of different sizes form the label strip. In order to permit the labelling apparatus to be reset to a different lable size within a short time, the synchronizing mechanism advantageously includes a speed override mechanism. This permits the pallet rotor to be angularly displaced relative to the vacuum cylinder, so that the individual labels will always be disposed on respective pallets of the pallet rotor at a centered position.

According to another advantageous provision, a label exhaustor pipe may be disposed adjacent the vacuum cylinder downstream of the pallet rotor in the direction of rotation Although in the case of wider gaps between bottles the label strip feeding mechanism can be stopped, it may in the case of single-bottle gaps be advantageous to let the strip-feeding operation continue. Since the separated individual label is in this case not picked up by a pallet of the pallet rotor, it may then in an advantageous manner removed from the vacuum cylinder by means of the label exhaustor.

In a second embodiment of the invention the spacing between the circumferential surface of the vacuum cylinder and the pallet rotor is not varied as in the first embodiment by shifting the respective axes relative to one another, but rather by the provision that the circumferential surface of the vacuum cylinder is composed of carrier surfaces alternating with recessed surfaces of a smaller radius, and that the vacuum cylinder is displaceable relative to the pallet rotor from its operative position, in which the adhesion surfaces are adapted to come into rolling contact with the carrier surfaces or respective labels adhering thereto, to an inoperative position in which the adhesion surfaces pass the recessed surfaces with a distance therebetween. The described configuration of the circumferential surface of the vacuum cylinder in the second embodiment permits the recessed surfaces of the vacuum cylinders to be aligned with respective pallets of the pallet rotor by altering the angular positions of the vacuum cylinder and the pallet rotor relative to one another to thereby reliably prevent the pallet surfaces from contacting the vacuum cylinder surface. This state then defines the inoperative position. In this second embodiment the vacuum cylinder is advantageously rotated in a controllably timed manner by the pallet rotor through a synchronizing transmission, the transmission train for rotating the vacuum cylinder being provided with a speed override mechanism permitting the angular positions of the pallet rotor and the vacuum cylinder to be varied relative to one another. In a particularly advantageous implementation of this embodiment, the speed override mechanism may be provided with a controllable adjustment mechanism, for instance a step motor, operable in response to control signals of an electronic control unit to alter the angular positions of the pallet rotor and the vacuum cylinder relative to one another to thereby establish the inoperative position in which the recessed surfaces of the vacuum cylinder are associated to the pallets of the pallet rotor. This angularly offset position may be maintained over any suitable length of time in accordance with the gap or interruption of the container supply, or can be rapidly cancelled after the occurrence of a single-container gap by returning the vacuum cylinder to its previously occupied operative position. A suitable speed override mechanism may for instance be a planetary gear mechanism with an adjustable outer gear engaged by the adjustment mechanism. When for instance a sensor disposed adjacent the rotary table of the labelling machine indicates the occurrence of a gap between containers, a suitable control unit may immediately apply a control signal to the adjustment mechanism, causing the latter to rotate the outer gear of the planetary gear mechanism to result in an override effect, for instance in a short-timed reduction of the speed of the vacuum cylinder relative to that of the pallet rotor, as a result of which a selected pallet which is to be prevented from picking up a label comes into alignment with a recessed surface portion of the vacuum cylinder and moves on without contacting the vacuum cylinder. If the next successive pallet is already intended to receive a label, the adjustment mechanism is activated immediately after the passage of the pallet associated to the gap between containers for temporarily increasing the rotary speed of the vacuum cylinder to thereby ensure that the leading edge of the next pallet comes into alignment with the leading edge of the label on the next carrier surface portion of the vacuum cylinder. In the case of an extended gap between containers, the above described angularly offset position in which the recessed surface portions of the vacuum cylinder are aligned with the pallets of the pallet rotor may be maintained until the sensor provided adjacent the rotary table of the labelling machine informs the control unit of the end of the gap. In the latter case the label strip feeding mechanism is preferably stopped for the duration of the inoperative state to thereby avoid unnecessary waste of labels. In the case of short-timed interruptions or gaps, the labels not transferred to the pallet rotor may be removed from the vacuum cylinder by means of a combined blower and exhaustor device.

In a similar manner the control unit may react to the absence of labels on the vacuum cylinder due for instance to breaking of the label strip or reaching the end of the label strip, with the aid of a suitable sensor installed adjacent the vacuum cylinder. The described second embodiment of the apparatus according to the invention is exceptionally suitable particularly for labelling machines operating at higher speeds. The employ of the vacuum cylinder permits the circumferential speed thereof to be adjusted to a higher rate than the strip feeding speed, and to select the desired length of the labels by controlling the slippage occurring between the supplied label strip and the vacuum cylinder. In this manner it is relatively simple to produce labels of different sizes by controlling the strip feeding speed. Any change of the length of the labels, however, requires at the same time a resetting of the vacuum cylinder relative to the pallets of the pallet rotor to therby ensure the centered alignment of the pallets with the labels carried on the vacuum cylinder. This resetting operation is suitably also accomplished by means of the already described speed override mechanism.

In a specific implementation of this second embodiment particularly for labelling machines operating at lower speeds, a particularly simple construction can be achieved by the provision that the transmission train from the pallet rotor to the vacuum cylinder includes a releasable clutch in addition to the synchronizing transmission, so that a controllable locking mechanism acting on the vacuum cylinder can be operated to lock the vacuum cylinder in a position in which one of its recessed surface portions faces towards the pallet rotor. The drive transmission to the vacuum cylinder is interrupted by means of the releasable clutch simultaneously with the activation of the locking mechanism. Particularly suitable for this purpose is for instance an electromagnetically operable gear coupling. The controllable locking mechanism may suitably comprise a locking bolt mounted at a fixed position on the frame of the apparatus and cooperating with recesses formed in the vacuum cylinder, for instance in one of its end faces. A double-acting pneumatic cylinder is particularly suitable for operating the locking bolt. When a sensor mounted adjacent the rotary table indicates the end of a gap between containers, the rotation of the vacuum cylinder is started by engaging the clutch or coupling immediately after the locking mechanism has been released. This construction offers the advantage that the control mechanism for establishing the inoperative state is particularly simple. The described embodiments can also be realized without a synchronizing transmission and a speed override mechanism by providing the vacuum cylinder with its own drive source in the form of an electric motor controlled by an electronic control unit. The electric motor may for instance be a servo motor or step motor operable to rotate the vacuum cylinder at a speed corresponding to the actual operating speed of the labelling machine, and in case of need to adjust it to an inoperative position as by altering its relative angular position as described above.

Figure 2:
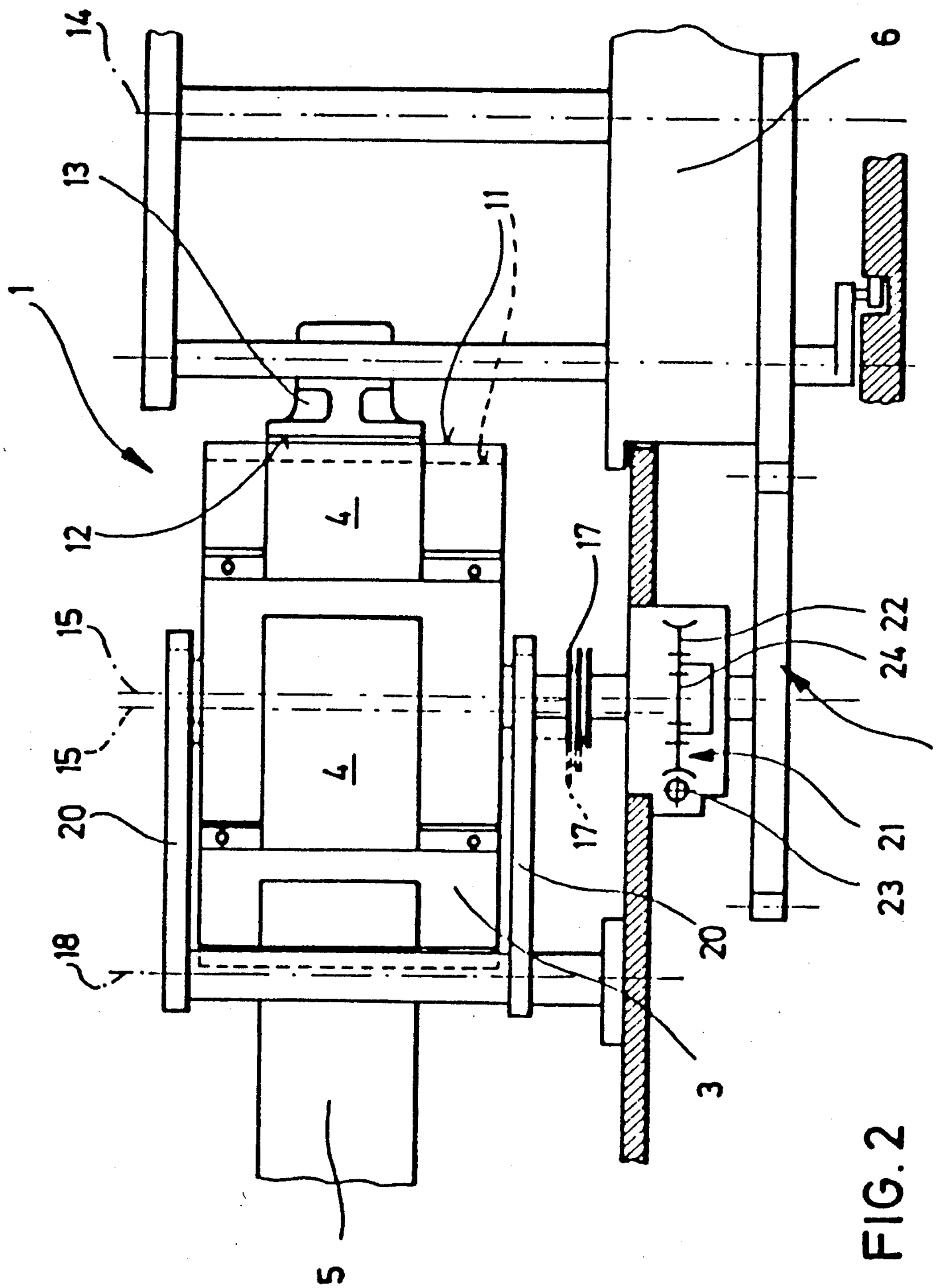
Figure 3:
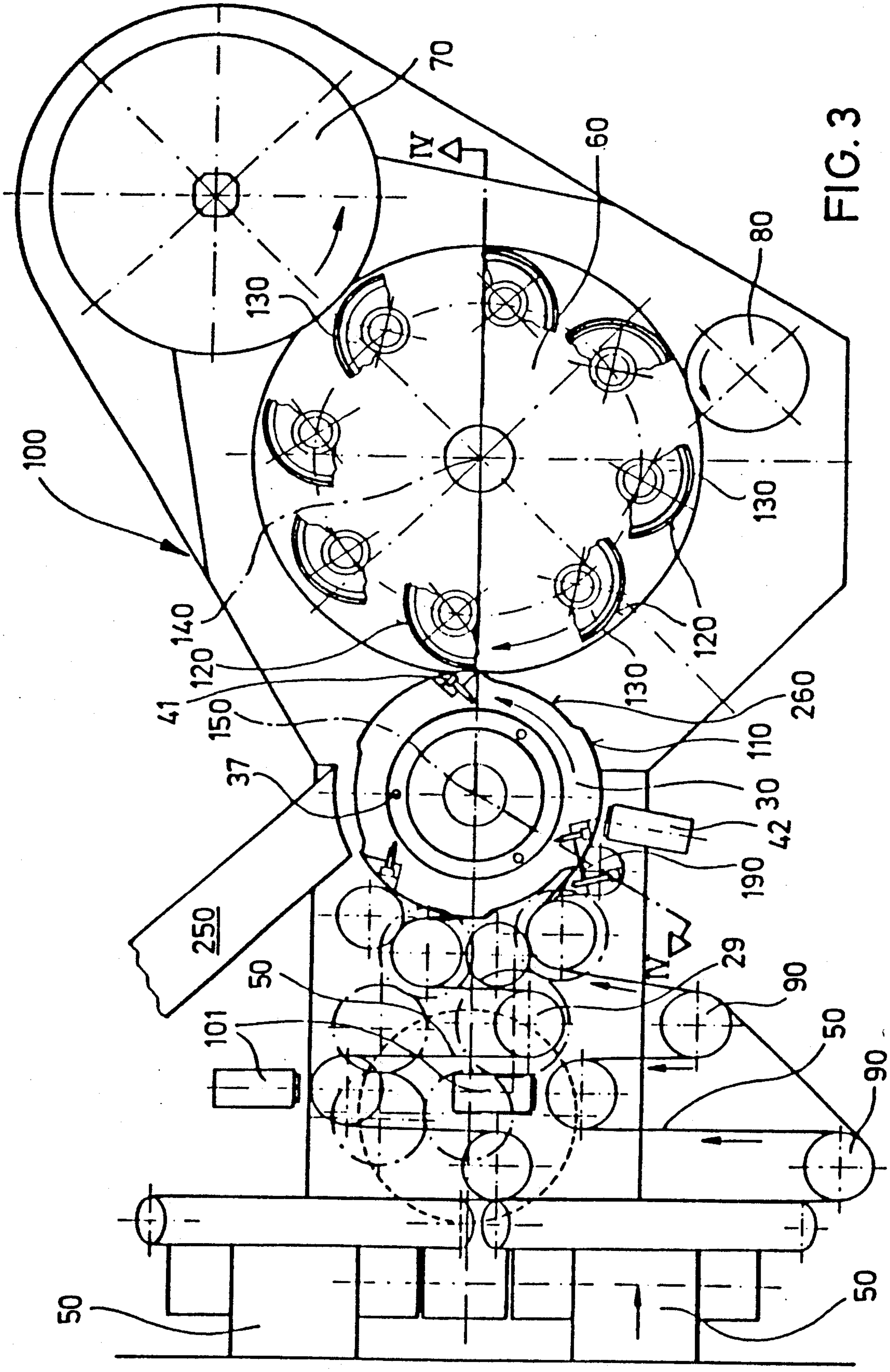
Figure 4:
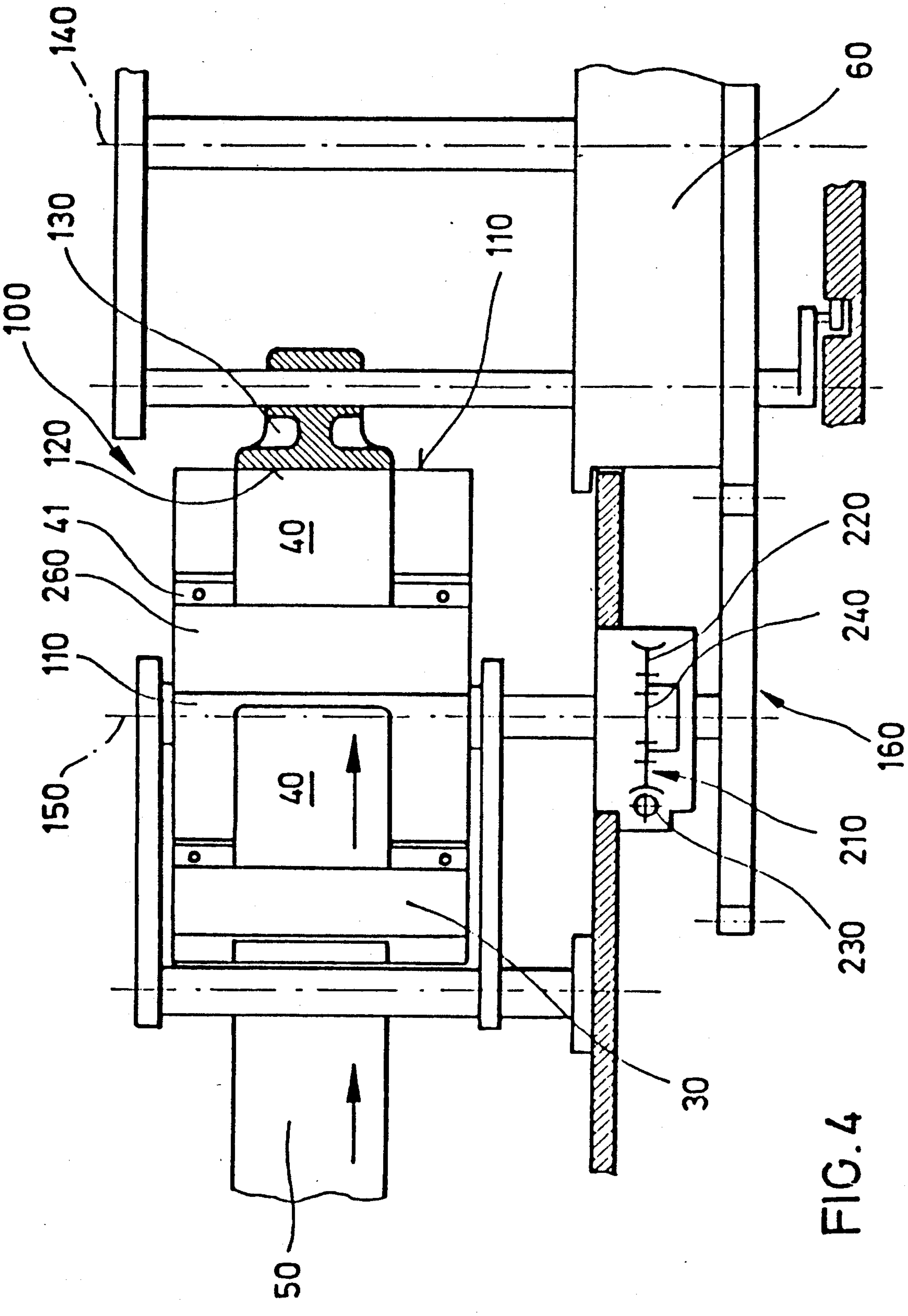

Embodiments of the invention shall now be described in detail by way of example with reference to the accompanying drawings, wherein:

FIG. 1 shows a diagrammatic top plan view of a labelling apparatus according to a first embodiment of the invention, FIG. 2 shows a vertical section through the labelling apparatus of FIG. 1, taken along the line II—II, FIG. 3 shows a diagrammatic top plan view of a labelling apparatus according to a second embodiment of the invention, FIG. 4 shows a vertical section through the labelling apparatus of FIG. 3, taken along the line III—III, and FIG. 5 shows a sectional view similar to the vertical section of FIG. 4, illustrating a modification of the second embodiment depicted in FIG. 3.

Shown in FIG. 1 is a first embodiment of an apparatus 1 for affixing labels to upright disposed containers. Apparatus 1 comprises a controllable label strip feeding mechanism followed by a blade cylinder 3 mounted for rotation about a vertical axis for separating individual labels 4 from a label strip 5, a pallet rotor 6, a transfer cylinder 7, and an adhesive applicator roller 8.

As clearly evident from FIG. 1, the labelling apparatus is provided with two label strip feeding mechanisms 2 operable to convey a respective label strip 5 over a plurality of guide pulleys 9 and past respective optical reading sensors 10 towards blade cylinder 3.

Blade cylinder 3 is designed as a vacuum cylinder. In the operative state of the apparatus pallet rotor 6 is disposed tangentially closely adjacent the circumferential surface 11 of vacuum cylinder 3.

The circumferential surface 11 of vacuum cylinder 3 and the circumferential surface of pallet rotor 6, the latter beeing formed by the adhesive-coated surfaces of the individual adhesive pallets, or the imaginary envelope thereof, respectively, are disposed at a radially variable spacing from one another. From an operative position indicated by solid lines in FIG. 1, circumferential surfaces 11 and 12 can be displaced to an offset inoperative position (indicated by dotted lines), in which circumferential surface 11 of vacuum cylinder 3 and circumferential surface 12 of pallet rotor 6 are radially spaced from one another.

As particularly clearly evident from FIG. 2, the axes of rotation 14 and 15 of pallet rotor 6 and vacuum cylinder 3, respectively, are mounted at a variable radial spacing from one another, a synchronizing transmission 16 operatively connecting the axis of rotation 14 of pallet rotor 6 to the axis of rotation 15 of vacuum cylinder 3 being provided with coupling means 17 for compensating the radial shifting of the axes relative to one another.

In the illustrated embodiment, the coupling means shown is of the type of the commercially available "Schmidt-Kuuplung". This coupling device is capable of compensating the radial shift of the axes without a resultant variation of the relative angular positions.

As likewise clearly shown in FIG. 2, the variation of the spacing between circumferential surfaces 11 and 12 is made possible by vacuum cylinder 3 being mounted radially displaceable away from pallet rotor 6. The thus displaced position of vacuum cylinder 3 is likewise indicated in FIG. 2 by dotted lines.

As evident from FIGS. 1 and 2, vacuum cylinder 3 is mounted for displacement about a pivot axis extending parallel to its axis of rotation 15.

As shown in FIG. 1, blade cylinder or vacuum cylinder 3 cooperates with a stationary knife 19 mounted at a fixed position relative thereto. The above mentioned pivot axis 18 extends approximately in the direction of the longitudinal axis 18 of stationary knife 19 as shown in FIG. 2.

Vacuum cylinder 3 and stationary knife 19 are both mounted on a common pivot lever 20 for displacement about pivot axis 18. As a result, stationary knife 19 follows any pivotal displacement of vacuum cylinder 3, so that the blade cylinder will always be functional regardless of the position it assumes.

As likewise clearly shown in FIG. 2, synchronizing transmission 16 includes an overriding gear mechanism 21 disposed below Schmidt-Kupplung 17 and substantially consisting of a planetary gear transmission, the outer gear of which is rotatable by means of a worm engaging the outer periphery of outer gear 22, as a result of which the driven shaft 15 of vacuum cylinder 3 connected to the sun gear 24 of the planetary transmission is rotated about a corresponding angle without any change in the transmission ratio between pallet rotor 6 and vacuum cylinder 3.

As still further shown in the top plan view of FIG. 1, a label exhaustor pipe 25 is disposed adjacent vacuum cylinder 3 downstream of pallet rotor 6 in the direction of rotation. Label exhaustor pipe 25 is connected to a not shown exhaustor fan and serves the purpose of removing labels which have not been removed from vacuum cylinder 3 by adhesive pallets 13. Instead of an exhaustor pipe it would also be possible to provide a blow-off device.

The function of the apparatus according to the invention in operation shall now be explained in further detail.

The supply of labels takes place by means of one of the two label feeding mechanisms 2, the provision of two such mechanisms permitting the labelling operation to be continued without interruption while one cf the respective supply reels is being replaced.

The accurate alignment of the printed label strip 5 is ensured by a print mark control unit associated to optical reading sensors 10.

The accurate cutting of individual labels 4 from label strip 5 is ensured by way of a slippage control operation. This implies that the circumferential speed of vacuum cylinder 3 is greater than the feed rate of label strip 5. As a result, a slippage occurs between label strip 5 and vacuum cylinder 3, this slippage being effective on the one hand to ensure that label strip 5 is always tightly engaged with vacuum cylinder 3. The length of individual label 4 cut from strip 5 can be determined by increasing or decreasing the strip feeding rate. If it is for instance required to cut shorter labels without altering their number per time unit, the only measure to be taken is to reduce the strip feeding rate, resulting in increased slippage between vacuum cylinder 3 and label strip 5.

After having been cut off between blade cylinder 3 and stationary knife 19, the individual labels 4 are carried along on vacuum cylinder 3 for about a quarter of a revolution, and than removed from vacuum cylinder 3 by the adhesive-coated surfaces 12 of adhesive pallets 13 to be subsequently picked up by transfer cylinder 7 operable to transfer the individual labels 4 to containers—not shown in the drawings—to be labelled. The empty pallets 13 are then again adhesive-coated by applicator roller 8, enabling them to pick up successive labels from vacuum cylinder 3.

If there occurs a gap or an interruption in the supply of containers to the labelling apparatus, or if a certain container is already printed and must therefore not be labelled, this fact may be detected by a not shown sensor disposed upstream of the labelling apparatus and operable to transmit a control signal to the labelling apparatus. This control signal causes pivot lever 20 to be pivoted about pivot axis 18 for displacing vacuum cylinder 3 away from pallet rotor 6, resulting in a widening of the distance between circumferential surface 11 of vacuum cylinder 3 and the surfaces 12 of adhesive pallets 13 of pallet rotor 6.

Due to this widening of the named distance the adhesive-coated pallet 13 associated to the gap between containers is prevented from removing a label from vacuum cylinder 3. It does not even come into contact with vacuum cylinder 3, and can therefore not soil its circumferential surface 11 with the adhesive. The individual labels 4 not removed from vacuum cylinder 4 may subsequently be removed therefrom by means of exhaustor pipe 25. It is specifically to be noted that the label cutting mechanism consisting of blade cylinder 3 and stationary knife 19 continues to operate although the label supply to pallet rotor 6 is interrupted.

The Schmidt-Kupplung or clutch 17 employed permits vacuum cylinder 3 to be shifted even under load, without resulting in a change of the relative angular position. The displacement of vacuum cylinder 3 may be carried out by means of a pneumatic cylinder (not shown) acting on pivot lever 20.

When other containers are to be provided with labels of a greater length, requiring adhesive pallets 13 to be exchanged against pallets of a greater size, override gear mechanism 21 may be operated by rotating worm 23 for correcting the angular position of vacuum cylinder 3 relative to pallet rotor 6. As evident from FIG. 1, this correction is necessary for preventing the knife edges of blade cylinder 3 from impinging on the surfaces of adhesive pallets 13. The angular positions of pallet rotor 6 and blade cylinder 3 relative to one another has always to be adjusted in such a manner that the rear edge of an adhesive pallet 13 extends always in front of the associated knife of blade cylinder 3 in the direction of rotation.

The widening of the distance between the circumferential surfaces of the vacuum cylinder and the pallet rotor may also be achieved by radial displacement of individual adhesive pallets relative to the axis of rotation of the pallet rotor.

A second embodiment shall now be described with reference to FIG. 3, a first implementation of this second embodiment being illustrated in FIG. 4, FIG. 5 depicting a second implementation thereof.

In the second embodiment according to FIG. 3, a labelling apparatus as a whole is designated by reference numeral 100. The illustrated apparatus is disposed adjacent a not shown container handling installation, for instance a rotary table of a labelling machine, and consists substantially of a only diagrammatically indicated transfer cylinder 70, a pallet rotor 60 having an axis 140, an adhesive applicator roller 80 and a vacuum cylinder 30 equipped with three revolving blades 41 cooperating with a stationary knife 190 disposed adjacent its periphery for separating individual labels 40 from a label strip 50 selectively supplied by one of two strip feeding mechanism provided for this purpose. Each strip feeding mechanism comprises a plurality of guide pulleys 90 provided with an own drive mechanism 29, and a reading sensor 101 for the print mark control operation. The provision of two strip feeding mechanisms ensures a substantially ininterupted operation of labelling apparatus 100 as the end of a label strip is reached by shifting to the second strip feeding mechanism while the empty supply reel of the first feeding mechanism is being replaced.

The leading end of the supplied label strip 50 is retained under slippage on the circumferential surface of vacuum cylinder 30 by the provision of vacuum passages formed therein. Disposed adjacent the periphery of vacuum cylinder 30 immediately downstream of stationary knife 190 is an optical sensor 42 for monitoring the presence of individual labels 40 on vacuum cylinder 30 and for immediately indicating the absence of a label. As further clearly shown in FIG. 3, the circumferential surface of vacuum cylinder 30 includes raised carrier surface portions 110 alternating with recessed surface portions 260 extending at a smaller distance from the stationary axis of rotation 150, each carrier surface portion 110 being located in front of an associated one of the revolving blades 41 in the direction of rotation of vacuum cylinder 30. Again in front thereof, and to a location adjacent the preceding blade 41, the associated recessed surface portion 260 extends at a smaller radius with respect to the fixedly disposed axis of rotation 150. In the operative position the angular positions of the pallet rotor 60 carrying oscillatingly driven pallets 130 having adhesive-coated adhesion surfaces 120 and of vacuum cylinder 30 relative to one another is adjusted so that the adhesion surfaces 120 of pallets 130 cooperate with associated ones of the carrier surface portions 110 of vacuum cylinder 30 by coming into rolling contact therewith, so that the labels carried thereon are picked up by the pallets 130 and transferred to transfer cylinder 70 itself operable to transfer the labels onto the passing containers. The inoperative state in which a label 40 is not picked up from a carrier surface portion 110 by any of the adhesion surfaces 120 may be achieved immediately after the separation of a preceding pallet 130 from the associated carrier surface portion 110 by altering the angular positions of vacuum cylinder 30 and pallet rotor 60 relative to one another, so that the next following pallet 130 is brought into alignment with a recessed surface portion 260 of vacuum cylinder 30 and does thus not contact the circumferential surface of vacuum cylinder 30. The adjustment to the described inoperative state may become necessary for various reasons, for instance gaps or interruptions of the container supply in the container handling installation, the absence of labels on vacuum cylinder 30 due to a broken label strip or exhaustion of the label supply, or during the start-up phase of the labelling apparatus, during which it is customary to coat the adhesion surfaces 120 of pallets 130 with an adhesive for some time prior to the supply of labels thereto. The adjustment to the inoperative state in which an adhesion surface 120 is aligned opposite a fecessed surface portion 260 can be accomplished in different manners.

Shown in FIG. 4 by way of a first example is the manner in which the inoperative state can be brought about in this second embodiment. As pallet rotor 60 rotates about its axis 140, its rotation is transmitted to vacuum cylinder 30 through synchronizing gear transmission 160, causing vacuum cylinder 30 to rotate about its fixed axis 150. Disposed between synchronizing gear transmission 160 and vacuum cylinder 30 is an override transmission mechanism 210 substantially consisting of a planetary gear transmission having an interiorly toothed outer wheel 220 adapted to be rotated by a worm engaging its outer periphery, so that the drive shaft 150 of vacuum cylinder 30 connected to the sun gear 240 can be rotated about a corresponding angle without thereby altering the original transmission ratio between pallet rotor 60 and vacuum cylinder 30. The worm employed for the adjustment of outer gear 220 is driven by a controllable adjustment actuator 230, a particularly suitable actuator for this purpose being a step motor.

When for instance a sensor disposed adjacent the rotary table of the labelling machine and not shown in the drawings informs the control unit of the machine of a gap in the container supply, the latter may operate immediately after the trailing edge of a pallet 130 carrying the last label 40 to be picked up has been lifted off the vacuum cylinder, to apply a control signal to adjustment actuator 230, causing the outer gear 220 of planetary gear transmission 210 to be rotated. This results in a reduction of the circumferential speed of vacuum cylinder 30 relative to that of pallet rotor 60 so that on arrival of the next following pallet 130 the recessed surface portion 260 following the previous carrier surface portion 110 is substantially centered on the imaginary line interconnecting the axes of rotation 140 and 150 of pallet rotor 60 and vacuum cylinder 30, respectively. After this relative angular position has been established, adjustment actuator 230 is stopped, so that vacuum cylinder 30 is again rotated at its original circumferential speed, as a result of which the coordination of pallets 230 with the recessed surface portions of vacuum cylinder 30 brought about by the adjustment of the relative angular positions is maintained, preventing the pickup of labels by adhesion surfaces 120 until the sensor located adjacent the rotary table of the labelling machine signals the end of the gap in the container supply. At this instance the control unit of the machine applies a control signal to adjustment actuator 230 to thereby increase the rotary speed of vacuum cylinder 30 for a short instant, as a result of which the first pallet 130 destined to pick up a label 40 is brought into contact at its leading edge with an individual label 40 supported on a carrier surface 110. Vacuum cylinder 30 subsequently continues to rotate at its original speed and at its original relative angular position. In the case of container supply interruptions of extended duration, strip feeding drive mechanism 29 may be stopped, while in the case of shorter gaps, individual labels are removed by means of the blow-off or exhaustor device 250.

A similar sequence of operations may be carried out for instance when sensor 42 detects the absence of a label on vacuum cylinder 30. In this case any contact of the adhesive-coated adhesion surfaces 120 and the carrier surfaces 110 formed with the vacuum ports is undesirable for functional reasons, because on the one hand such contact may result in obturation of the vacuum ports, while on the other hand the subsequent labels would adhere to the carrier surfaces 110. Similar conditions prevail during the start-up phase of the labelling apparatus, because at that time the label feeding mechanism is usually stopped while pallets 130 are being provided with an adhesive base coating.

FIG. 5 shows a sectional view corresponding to FIG. 4 and illustrating a modification of the second embodiment of the invention according to FIG. 3. This modified embodiment is particularly suitable for labelling machines operating at a reduced speed of up to about 8,000 containers per hour. The basic difference between this modification and the embodiment shown in FIG. 4 consists in that in the inoperative state the vacuum cylinder 300 does not continue to rotate in unison with the pallet rotor 600, but is stopped instead at a predetermined position whereat one of its recessed surface portions 261 is substantially centered on an imaginary line interconnecting the axes of rotation 141 and 151 of pallet rotor 600 and vacuum cylinder 300, respectively. Provided for this purpose is a controllable locking mechanism 350 operable to stop vacuum cylinder 300 at any of its three possible inoperative positions. Simultaneously therewith a releasable clutch 171 in the transmission train between synchronizing transmission mechanism 161 and vacuum cylinder 300 is operated to interrupt the driving power transmission. Particularly suitable for this purpose is an accurately controllable electromagnetically operated gear coupling for instantaneously interrupting the drive power transmission when a pneumatically operated locking bolt 360 of locking mechanism 350 is brought to the locking position. To this purpose locking bolt 360 is mounted on an upper cross beam extending between a column 180 carrying the stationary knife and the drive shaft 150 of vacuum cylinder 300. This cross beam 200 is not shown in FIG. 3 for the sake of clearness. The upper end face of vacuum cylinder 300 is formed with three recesses 370 at suitable angular spacings for the locking engagement therein of locking bolt 360 in its locking position. Recesses 370 may for instance be formed as cylindrical bores and located so as to ensure that in the respective locking positions one of the recessed surface portions 261 is facing pallet rotor 600 in the above-described inoperative position. In response to a corresponding control signal a double-acting pneumatic cylinder acting on locking bolt 360 may be operated to retract locking bolt 360 from the engaged recess 370, while at the same time clutch 171 is re-engaged to re-establish the operative connection to synchronizing transmission mechanism 160. This establishment of the drive-transmitting connection of vacuum cylinder 300 through clutch 171 is accurately carried out at a predetermined position of the next following pallet 131, so that the latter can be brought into congruent rolling contact with the associated individual label 400. Reference numeral 211 designates a speed override transmission mechanism corresponding to the one shown in FIG. 4, while reference numerals 221 and 241, respectively, designate an outer gear and a sun gear performing the same functions as described with reference to FIG. 4.

In this embodiment the length of the labels may likewise be controlled by controlling the label strip feeding rate, resulting in a variable slippage between the surface of vacuum cylinder 300 and label strip 500. A change-over from one label length to another one therefore requires the blades 401 of vacuum cylinder 300 responsible for cutting the trailing edges of the labels to be adjusted into alignment with the rear edges of the new pallets 131 to thereby ensure congruent rolling contact of pallets 131 with the individual labels 400. This operation may also be suitably accomplished by means of the above mentioned speed override transmission mechanism 211, with an adjustment of outer gear 221 by means of a manually operable worm being fully adequate in this case. The modified embodiment of the apparatus according to the invention as described with reference to FIG. 5 is specifically characterized by a relatively simple control mechanism and procedure for achieving the inoperative state.

I claim:

1. A labelling apparatus for affixing labels to containers, wherein the labels are supplied as a strip material (5, 50, 500), said label strip being supplied to the cutting cylinder or vacuum cylinder, respectively, by a feeding mechanism having a controllable drive mechanism (9, 90), including a cutting mechanism for separating individual labels from said label strip, and a pallet rotor (6, 60, 600) provided with adhesion surfaces for receiving separated individual labels thereon, characterized in that said cutting mechanism is composed of a stationary knife (19, 190) and a vacuum cylinder (3, 30, 300) equipped with revolving blades (51, 401), that the circumferential surfaces (11, 110; 12, 120) of said vacuum cylinder are disposed at a variable radial spacing with respect to those of said pallet rotor, so that in the operative position of said vacuum cylinder its circumferential surface extends tangentially closely adjacent that of said pallet rotor, and that in an inoperative position the circumferential surface of said vacuum cylinder is disposed at a radial spacing with respect to that of said pallet rotor.

2. A labelling apparatus according to claim 1, characterized in that the axis of rotation (15) of said vacuum cylinder (3) is disposed at a variable radial spacing, that said pallet rotor is operatively connected to said blade cylinder through a synchronizing transmission, and that said synchronizing transmission (16) includes coupling means (17) for compensating an axis offset shift.

3. A labelling apparatus according to claim 2, characterized in that said vacuum cylinder (3) is mounted for radial displacement away from said pallet rotor (6).

4. A labelling apparatus according to claim 3, characterized in that said vacuum cylinder (3) is mounted for pivotal displacement about a pivot axis (18) extending parallel to its axis of rotation (15).

5. A labelling apparatus according to claim 4, characterized in that said pivot axis (18) approximately coincides with the longitudinal axis of said stationary knife (19).

6. A labelling apparatus according to claim 1, characterized in that said vacuum cylinder (3) is formed as a blade cylinder and mounted on a common pivot lever (20) together with said stationary knife (19).

7. A labelling apparatus according to claim 2, characterized in that said synchronizing transmission (16) includes an override section (21).

8. A labelling apparatus according to claim 1, characterized in that a label exhauster pipe (25) is provided adjacent said vaccum cylinder (3) downstream of said pallet rotor (6) in the direction of rotation.

9. A labelling apparatus according to claim 1, characterized in that the circumferential surface of said vacuum cylinder (30) is composed of carrier surfaces (110) alternating with recessed surfaces (260, 261) of a smaller radius, and that said vacuum cylinder (30, 300) is displaceable relative to said pallet rotor (60, 600) from its operative position, in which said adhesion surfaces (120) are adapted to contact said carrier surfaces (110) or respective labels (40, 400) adhering thereto, to an inoperative position in which said adhesion surfaces (120) pass said recessed surfaces (260, 261) with a distance therebetween.

10. A labelling apparatus according to claim 9, characterized in that said vaccum cylinder (30, 300) is operatively connected in a controllably timed manner to said pallet rotor (60, 600) through a synchronizing transmission (160, 161).

11. A labelling apparatus according to claim 10, characterized in that said synchronizing transmission (160, 161) includes a speed overriding transmission section (210, 211) for said vacuum cylinder (30, 300).

12. A labelling apparatus according to claim 11, characterized in that said speed overriding transmission section (210, 211) is connected to a controllable adjustment mechanism (230) operable to vary the angular position of said vacuum cylinder (30, 300) relative to said pallet rotor (60, 600).

13. A labelling apparatus according to claim 10, characterized in that said synchronizing transmission (162) includes a clutch (171) cooperating with said vacuum cylinder (300) and releasable during operation.

14. A labelling apparatus according to claim 13, characterized in that said vacuum cylinder (300) is provided with a controllable locking mechanism (350) operable in the inoperative position of said vacuum cylinder (300) to non-rotatably connect it to the frame of the apparatus.

15. A labelling apparatus according to claim 14, characterized in that said locking mechanism (350) comprises a pneumatically operable locking bolt (360) mounted at a fixed position on said frame, and complementary recesses (370) formed in said vacuum cylinder (300) for the locking engagement of said locking bolt (360) in the inoperative position, the number of recesses (370) thus provided corresponding to the pitch of said vacuum cylinder (300).

16. A labelling apparatus according to claim 14, characterized in that the operation of said locking mechanism (350) is accompanied by the simultaneous actuation of said clutch (171) for interrupting the drive transmission to said vacuum cylinder (300).

17. A labelling apparatus according to claim 1, characterized in that said vacuum cylinder (3, 30, 300) is provided with its own electromotive drive mechanism controlled by a respective control unit in accordance with the actual operating speed of the labelling apparatus.

* * * * *